United States Patent Office 3,526,823
Patented Sept. 1, 1970

3,526,823
SWITCHING REGULATOR CONTROL CIRCUIT
Luther L. Genuit, Scottsdale, Ariz., assignor to General
Electric Company, a corporation of New York
Filed Mar. 9, 1967, Ser. No. 621,884
Int. Cl. H02m 3/32, 1/08; H02h 7/14
U.S. Cl. 321—2                                              10 Claims

ABSTRACT OF THE DISCLOSURE

A bistable multivibrator alternately supplies positive trigger pulses to first and second silicon controlled rectifiers of a switching regulator. Each trigger pulse causes the switching regulator to deliver a predetermined quantity of electrical energy to a filter capacitor. An oscillator coupled to the multivibrator provides signals which control the frequency of the positive trigger pulses from the multivibrator. A comparator circuit compares the voltage across the filter capacitor with the voltage from a constant voltage supply and controls the frequency of the signals from the oscillator so that the voltage across the filter capacitor is substantially constant.

CROSS-REFERENCE TO RELATED APPLICATION

The switching regulator shown in the present application is disclosed in a U.S. patent application by Luther L. Genuit, filed Nov. 1, 1966, Ser. No. 591,204 entitled Switching Regulator, which is assigned to the same assignee as the present invention.

BACKGROUND OF THE INVENTION

This invention relates to switching regulators and more particularly to switching regulator control circuits which are designed to provide trigger pulses which cause a switching regulator to supply a regulated D.C. voltage.

In high speed data processing systems, microcircuits are used to reduce the physical size of the system and to increase the operating speed. These microcircuits are built in modules each of which may replace a large number of circuits using discrete circuit components. Each of these microcircuit modules requires as much power as several circuits using discrete components so that the power required in a single cabinet of a data processing system using microcircuit modules is several times as large as the power required in a single cabinet using the discrete components when the two cabinets have the same physical size. In addition, high speed microcircuits usually use a much smaller value of D.C. voltage than circuits employing discrete components. For example, in many high speed microcircuits the required D.C. voltage may be less than 1 volt. This voltage must be well regulated to provide a constant value of D.C. voltage for the microcircuits, otherwise variations in D.C. voltage may produce error signals in the data processing system.

The power supplied to any system is a product of the voltage and current so that a power distribution system must supply either a large value of current at a relatively small value of voltage or a smaller value of current at a relatively large value of voltage in order to provide a large amount of power. In prior art power supplies, power from a 220 volt A.C. line is converted into a relatively small value of D.C. voltage and large amounts of current are distributed by large conductors or "bus" bars to various portions of the data processing system. The voltage drop in each bus bar is proportional to the amount of current in the bus bar so that the value of voltage supplied to each portion of the data processing system varies as the current supplied to that portion varies. This variation in voltage may produce error signals in the data processing system.

Another disadvantage of the prior art power supplies is that the efficiency of the supplies is very low. These power supplies usually include a constant voltage transformer and a rectifier which converts the A.C. voltage to a D.C. voltage, and a series regulator which reduces the D.C. voltage to a small but constant value. In such a system the voltage drop in the constant voltage transformer, the rectifier and the series regulator is usually about 5–6 volts while the output voltage necessary for the microelectronic circuits may be as low as 1 volt. This means that the power transformer must deliver approximately 6 to 7 times the power which is used by the microcircuit so that the overall efficiency of the power supply is less than 20 percent thereby causing the power supplies to be bulky and expensive. Because of the large size, these power supplies are usually located in a separate cabinet and require long bus bars to distribute the current to the other portions of the data processing system. These long bus bars cause severe variations in voltage when current in the bus bar varies.

Still another disadvantage of the prior are power supplies is that excessively large values of current drawn from the power supply can cause damage to the series regulator and other parts of the power supply. Also a short circuit in the series regulator may cause a large value of voltage to be supplied to the microcircuit modules. This large value of voltage can cause damage to the microcircuit.

A power supply system employing switching regulators and switching regulator control circuits alleviates the disadvantages of the prior art by converting an A.C. voltage to a relatively large value of unregulated D.C. voltage. This D.C. is distributed at a relatively large voltage but low current to various portions of the data processing system thereby allowing the use of relatively small conductors. A "standby" power supply comprising a plurality of batteries can be employed to supply the relatively large value of D.C. voltage in the event of the failure of the voltage on the A.C. line. This relatively large value of unregulated D.C. voltage can be converted to a relatively small value of regulated D.C. voltage by switching regulators which are positioned at a plurality of locations in the data processing system. The switching regulator has an efficiency which is several times the efficiency of prior are power supplies employing series regulators thereby causing the physical size of the switching regulator to be relatively small and allowing the switching regulator to be positioned near the microcircuit modules.

The switching regulator may employ a transformer, a pair of silicon controlled rectifiers and a switching regulator control circuit to convert an unregulated D.C. voltage, such as 150 volts to an accurately regulated voltage, such as 1 volt. The silicon controlled rectifiers are employed as switches between the source of unregulated D.C. voltage and the transformer. The silicon controlled rectifiers are located on the "high" voltage side of the transformer where the current and the power losses in these rectifiers are low thereby causing the switching regulator to have a high degree of efficiency. The regulated D.C. voltage obtained from a secondary winding on the transformer is supplied to a pair of voltage output terminals. The transformer provides isolation between the regulated D.C. voltage and the source of unregulated D.C. voltage so that a short circuit in the silicon controlled rectifiers will not cause damage to the microcircuit modules which provide the load on the switching regulator.

The switching regulator control circuit is coupled to the voltage output terminals and develops trigger pulses whose frequency is determined by the value of voltage at the voltage output terminals. The trigger pulses are coupled to the silicon controlled rectifiers in the switching regulator and cause these rectifiers to deliver energy through the transformer to the voltage output terminals. The switching regulator control circuit senses any change in the value of the regulated output voltage and causes a change in the frequency of the trigger pulses delivered to the switching regulator. This change in the frequency of the trigger pulses causes a change in the quantity of energy which the switching regulator delivers to the output terminals so that the voltage at the output terminals returns to the original regulated value.

It is therefore an object of this invention to provide an improved switching regulator control circuit.

Another object of this invention is to provide a switching regulator control circuit which provides signals to a first and second pair of output terminals.

Still another object of this invention is to provide a switching regulator control circuit which provides trigger pulses alternately to a first and to a second pair of output terminals.

A further object of this invention is to provide a switching regulator control circuit having means for preventing signals from being simultaneously delivered to a first and a second pair of output terminals.

A still further object of this invention is to provide a switching regulator control circuit having means for preventing the generation of trigger pulses during a time that an associated switching regulator is delivering pulses of current to an output filter capacitor.

Another object of this invention is to provide a switching regulator control circuit which provides trigger pulses having a frequency determined by the value of a voltage applied to an input terminal.

A further object of this invention is to provide a switching regulator control circuit which disables an associated switching regulator when current drawn from the switching regulator exceeds a predetermined value.

A still further object of this invention is to provide a switching regulator control circuit which develops trigger pulses that cause the voltage from an associated switching regulator to be substantially constant for a wide range of values of current supplied to a load.

SUMMARY OF THE INVENTION

The foregoing objects are achieved in the instant invention by providing a new and improved switching regulator control circuit which alternately provides trigger pulses to a first and a second pair of output terminals. These output terminals are connected to a pair of silicon controlled rectifiers located in the switching regulator. The switching regulator control circuit employs an oscillator, a bistable multivibrator and a comparator circuit. The oscillator generates a signal which triggers the bistable multivibrator so that the frequency of the multivibrator is the same as the frequency of the oscillator. The comparator circuit compares the output voltage from the switching regulator with the voltage from a constant-voltage reference supply. When the output voltage from the switching regulator changes from a predetermined value, the comparator provides a signal which changes the frequency of the oscillator and the multivibrator so that the output voltage again changes to the predetermined value.

Other objects and advantages of this invention will become apparent from the following description when taken in connection with the accompanying drawings.

DESCRIPTION OF THE PREFERRED EMBODIMENTS

Figure 1:
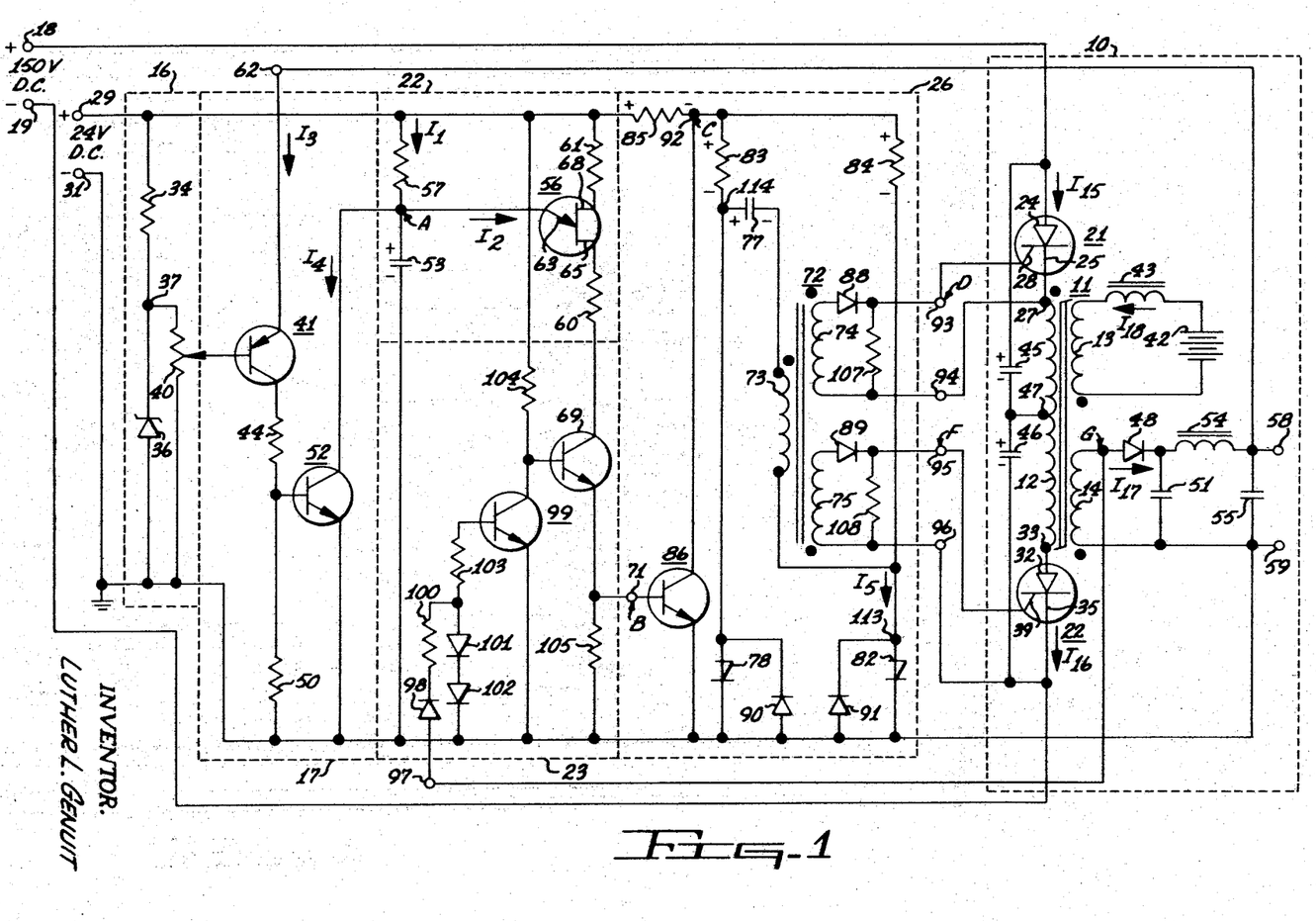
FIG. 1 is a schematic drawing of one embodiment of the instant invention.

Referring more particularly to the drawings by the characters of reference, FIG. 1 discloses a switching regulator control circuit which is designed to provide control signals for a switching regulator such as switching regulator 10 of FIG. 1. As indicated in FIG. 1, a comparator circuit 17 is coupled to a constant-voltage supply 16 and to the output terminals 58 and 59 of the switching regulator 10. Comparator circuit 17 is connected to a relaxation oscillator 22 and controls the frequency of the relaxation oscillator in response to the difference between the output voltage at terminal 58 and a reference voltage from the constant-voltage supply. Relaxation oscillator 22 in turn develops trigger pulses for a bistable multivibrator 26 which alternately provides positive pulses to silicon controlled rectifiers 21 and 22 of switching regulator 10.

Oscillator 22 includes a capacitor 53 and a resistor 57 connected in series between a positive terminal 29 and a negative terminal 31 of a D.C. power supply. A unijunction transistor 56 has an emitter 63 connected to the junction point between resistor 57 and capacitor 53. A resistor 60 is connected between a first base 65 and disabling circuit 23. A resistor 61 is connected between a second base 68 and positive terminal 29 of the D.C. power supply.

A unijunction transistor is a semiconductor device having a first base or "base-one," a second base or "base two" and an emitter. If a positive voltage difference exists between base-two and base-one, the unijunction transistor cannot conduct current between the emitter and base-one until a voltage greater than a first predetermined threshold or "peak point voltage" value exists between the emitter and base-one. When the voltage on the emitter is more than the peak point voltage, current flows from emitter to base-one until the emitter voltage decreases below a second predetermined or "valley voltage" value. A more detailed description of a unijunction transistor can be found in chapter 13 of the Transistor Manual, Sixth Edition, 1962, published by the General Electric Company, Syracuse, N.Y.

A current $I_1$ flowing from terminal 29 through resistor 57 to the upper plate of capacitor 53, from the lower plate of capacitor 53 to terminal 31 charges capacitor 53 until the voltage on the upper plate and on emitter 63 of unijunction transistor 56 exceeds the peak point voltage. When the voltage on emitter 63 exceeds the peak point voltage, a current $I_2$ flows from the upper plate of capacitor 53, through emitter 63, base 65, resistor 60, transistor 69 and resistor 105 to the lower plate of capacitor 53. Current $I_2$ through resistor 105 causes a voltage drop across resistor 105 which provides a positive trigger pulse to input terminal 71 of bistable multivibrator 26. Current $I_2$ quickly discharges capacitor 53 below the valley voltage needed to maintain unijunction transistor 56 conductive. Transistor 56 is rendered nonconductive and current $I_1$ again charges capacitor 53 until the voltage exceeds the peak point voltage of unijunction transistor 56. The values of resistor 57, capacitor 53 and the conductivity of a transistor 52 in comparator circuit 17 determine the rate at which capacitor 53 charges and thereby determines the frequency of the charge and discharge of capacitor 53.

The collector of transistor 52 is connected to the upper plate of capacitor 53 and the emitter of transistor 52 is connected to the lower plate of capacitor 53. The conductivity of transistor 52 is determined by the conductivity of a transistor 41 which, in turn, is determined by the value of voltage applied between the base and the emitter of transistor 41. The value of voltage on the base of transistor 41 is determined by resistor 34, Zener diode 36 and potentiometer 40. The D.C. power supply having a positive terminal 29 and a negative terminal 31, a resistor 34 and a Zener diode 36 provide a constant voltage with respect to ground potential at junction point 37. The Zener diode has a characteristic of providing a constant voltage drop across its terminals for a wide range of amplitude of currents flowing through the diode in a reverse direction. Therefore the voltage difference between junction point 37 and ground will be constant. A potentiometer 40 connected between junction 37 and ground supplies a reference voltage to the base of transistor 41.

Since the voltage on the base of transistor 41 is constant, the voltage at output terminal 58 of switching regulator 10 applied to the emitter of transistor 41 determines the conductivity of transistor 41. When the voltage at terminal 58 has a predetermined value, transistor 41 has a relatively large value of conductivity so that a current $I_3$ flows from terminal 62 through emitter to collector of transistor 41, through base to emitter of transistor 52 so that transistor 52 has a relatively large value of conductivity. The relatively large value of conductivity of transistor 52 causes a current $I_4$ to flow from the upper plate of capacitor 53 through collector to emitter of transistor 52 to the lower plate of capacitor 53. Current $I_4$ reduces the rate at which capacitor 53 charges so that the frequency of oscillator 22 is less than it would be without transistor 52 across capacitor 53.

When the voltage at output terminal 58 decreases due to an increase in current to a load (not shown) across output terminals 58 and 59, the voltage on the emitter of transistor 41 decreases. A decrease in voltage on the emitter of transistor 41 decreases the current $I_3$ through transistor 41 and decreases the base current in transistor 52. The decrease in base current decreases the current $I_4$ through transistor 52 thereby causing capacitor 53 to charge at a faster rate and increasing the frequency of relaxation oscillator 22. Increasing the frequency of oscillator 22 increases the frequency of pulses from bistable multivibrator 26 and increases the rate at which electrical energy is supplied to filter capacitors 51 and 55 by switching regulator 10 so that the output voltage at terminal 58 increases toward the predetermined value. The amount of electrical energy supplied to filter capacitors 51 and 55 is proportional to the frequency of oscillator 22. The frequency of oscillator 22 can be varied over a range from approximately 0–50 kilocycles per second so that the voltage across output filter capacitor 55 is substantially constant for a wide range of current supplied to a load (not shown) across output terminals 58 and 59.

An improved bistable multivibrator is provided for the switching regulator control circuit. This bistable multivibrator is simpler and uses fewer parts than prior art multivibrators. It also provides a high power gain so that the multivibrator provides a relatively large output signal in response to a relatively small input signal. As indicated in FIG. 1, the bistable multivibrator 26 comprises a pair of four-layer diodes 78 and 82 and a transformer 72 having a primary winding 73 and a pair of secondary windings 74 and 75. A four-layer diode is a semiconductor device having an anode and a cathode. The diode can be used as an ON-OFF switch which can be turned on or off in a fraction of a microsecond. Normally the four-layer diode cannot conduct current from the anode to the cathode thereof until a positive voltage greater than a threshold value or "switching voltage" exists between the anode and the cathode. If a positive voltage greater than the switching voltage exists between the anode and the cathode, the diode "turns on" i.e., is rendered conductive and a current will flow from the anode to the cathode. Once anode-cathode flow commences the diode can be "turned off" i.e., rendered nonconductive by reducing the anode to cathode current flow below a "holding current" or minimum current value. A more detailed description of a four-layer diode can be found in chapter 11 of the textbook Fundamentals of Semiconductor Devices by Lindmeyer and Wrigley, 1965, published by D. Van Nostrand Company, New York, N.Y.

A capacitor 77 is connected between one end of the primary winding 73 and four-layer diode 78. The other end of primary winding 73 is connected to the anode of four-layer diode 82 and to the cathode of diode 91. A pair of resistors 83 and 84 are connected in series between the anode of four-layer diode 78 and the anode of four-layer diode 82. A resistor 85 is connected between the positive terminal 29 of the power supply and the collector of transistor 86. The collector of transistor 86 is connected to the junction of resistors 83 and 84. The emitter of transistor 86 is connected to ground and the base of transistor 86 is coupled to input terminal 71. Each time a positive voltage pulse is applied to input terminal 71 transistor 86 is rendered conductive thereby causing the voltage at junction point 92 to decrease and causing the multivibrator to change states.

The operation of the multivibrator 26 will now be described. Assume that prior to time $t_1$ of FIG. 2 the four-layer diode 82 is conductive and four-layer diode 78 is nonconductive. When a four-layer diode is conductive, the voltage drop across the diode is much less than the switching voltage required to turn it on. For example, the switching voltage of diodes 78 and 82 is approximately 20 volts while the voltage drop across each of these diodes is approximately 2 volts after the diode is turned on. Prior to time $t_1$ a current $I_5$ flows from terminal 29 through resistor 85, resistor 84 and four-layer diode 82 to terminal 31. Current $I_5$ produces a voltage drop of approximately 7 volts of the polarity shown across resistor 85 thus resulting in a +17 volt potential at junction point 92. The 17 volt potential at junction point 92 and the 2 volt potential at the anode of four-layer diode 82 cause capacitor 77 to charge to 15 volts of the polarity shown.

At time $t_1$ the trigger pulse shown in waveform B (FIG. 2) is applied to terminal 71 causing transistor 86 to be rendered conductive. The voltage between the collector and the emitter of a typical transistor is approximately .2 volt when the transistor is conducting heavily. The positive trigger pulse in the base causes transistor 86 to conduct heavily so that the voltage at junction point 92 is approximately +.2 volt. The 15 volt potential across capacitor 77 causes a current $I_6$ to flow from the left plate of capacitor 77, through resistors 83 and 84 and primary winding 73 to the right plate of capacitor 77. Current $I_6$ produces a voltage drop of approximately 7.5 volts of the polarity shown across resistor 84. The 7.5 volt drop across resistor 84 combined with the +.2 volt at junction point 92 cause the voltage at junction point 113 and at the anode of four-layer diode 82 to be a negative voltage. The negative voltage at the anode of diode 82 causes the current through diode 82 to decrease below the holding current value so that diode 82 is turned off. The trigger pulse which renders transistor 86 conductive has a relatively short time duration so that there is a relatively small change in the voltage across capacitor 77 during this time duration which is shown as the time between times $t_1$ and $t_2$ in waveform B of FIG. 2.

When the voltage applied to the base of transistor 86 returns to a zero voltage value, transistor 86 returns to the nonconductive state causing the voltage at junction point 92 to rise. When the voltage at junction point 92 rises, the voltages at junction points 113 and 114 also rise. Because of the voltage across capacitor 77 the voltage at junction point 114 rises to a value equal to the switching voltage of four-layer diode 78 before the voltage at junction point 113 rises to a value equal to the switching voltage of four-layer diode 82. For example, if the voltage across capacitor 77 is 14 volts of the polarity shown in FIG. 1, the voltage at junction point 113 is +6 volts when the voltage at junction point 114 is +20 volts. This +20 volts at junction point 114 causes four-layer diode 78 to turn on.

When four-layer diode 78 turns on, a current $I_7$ flows from the left plate of capacitor 77 through four-layer diode 78, diode 91 and primary winding 73 to the right plate of capacitor 77. Another current $I_8$ also flows from junction point 92, through resistor 84 and primary winding 73 to the right plate of capacitor 77, from the left plate of capacitor 77 through four-layer diode 78 to terminal 31. Currents $I_7$ and $I_8$ through the primary winding 73 produce a positive voltage at the lower end of the primary winding 73 and couple a positive voltage to the upper end of the secondary winding 75. The voltage across winding 75 provides a positive trigger pulse to the gate of the silicon controlled rectifier 22 in switching regulator 10. Current $I_8$ continues to flow until capacitor 77 is charged to approximately 15 volts, opposite to the polarity shown in FIG. 1. At this same time a current $I_9$ flows from terminal 29 through resistor 85, resistor 83 and four-layer diode 78 to terminal 31. Current $I_9$ continues to flow after capacitor 77 is charged and produces a voltage drop shown across resistor 85 so the voltage at junction point 92 is again a +17 volts. Thus, the voltage at junction point 92 does not rise above the switching voltage of four-layer diode 82. Four-layer diode 78 continues to conduct and four-layer diode 82 remains turned on until another pulse from the oscillator 22 is applied to the input terminal 71 of multivibrator 26.

When the next pulse from oscillator 22 is applied to the input terminal 71 of the multivibrator 26, transistor 86 is rendered conductive so that the voltage at junction point 92 decreases to approximately +.2 volt. The 15 volt potential across capacitor 77 causes a current $I_{10}$ to flow from the right plate of capacitor 77, through primary winding 73, resistors 84 and 83 to the left plate of capacitor 77. Current $I_{10}$ produces a voltage drop of approximately 7.5 volts of the polarity shown across resistor 83. The 7.5 volt drop across resistor 83 combined with the +.2 volt at junction point 92 cause the voltage at junction point 114 and at the anode of four-layer diode 78 to be a negative voltage. The negative voltage at the anode of diode 78 causes the current through diode 78 to decrease below the holding current value so that diode 78 is turned off. The trigger pulse which renders transistor 86 conductive has a relatively short time duration so that there is a relatively small change in the voltage across capacitor 77 during this time.

When the voltage applied to the base of transistor 86 returns to a zero voltage value, transistor 86 returns to the nonconductive state causing the voltage at junction point 92 to rise. When the voltage at junction point 92 rises, the voltages at junction points 113 and 114 also rise. Because of the voltage across capacitor 77, the voltage at junction point 113 rises to a value equal to the switching voltage of four-layer diode 82 before the voltage at junction point 114 rises to a value equal to the switching voltage of four-layer diode 78. This voltage at junction point 113 causes four-layer diode 82 to turn on.

When four-layer diode 82 turns on, a current $I_{11}$ flows from the right plate of capacitor 77 through primary winding 73, four-layer diode 82 and diode 90 to the left plate of capacitor 77. Another current $I_{12}$ also flows from junction point 92, through resistor 83, to the left plate of capacitor 77, from the right plate of capacitor 77 through the primary winding 73 and four-layer diode 82 to terminal 31. These currents through the primary winding 73 produce a positive voltage at the upper end of primary winding 73 and couple a positive voltage to the upper end of secondary winding 74. The voltage across winding 74 provides a positive trigger pulse to the gate of the silicon controlled rectifier 21 in switching regulator 10. Thus, each time a positive pulse is applied to the input terminal 71 of the bistable multivibrator 26, the multivibrator changes from one state to the other state and supplies a positive trigger pulse to one of the silicon controlled rectifiers 21 and 22.

FIG. 1 also illustrates a switching regulator 10 which can be used in combination with the switching regulator control circuit to provide a substantially constant value of D.C. output voltage for a wide range of values of output current. As indicated in FIG. 1, a transformer 11 comprising a primary winding 12 having a center tap, and a pair of secondary windings 13 and 14 is coupled to a high voltage D.C. power supply having a positive output terminal 18 and a negative output terminal 19. A pair of silicon controlled rectifiers 21 and 22 controls the current supplied by the power supply to the primary winding of transformer 11. An anode 24 of silicon controlled rectifier 21 is connected to the positive terminal 18 of the high voltage power supply and a cathode 25 of the silicon controlled rectifier 21 is connected to a terminal 27 of the primary winding 12. Gate 28 and cathode 25 of the silicon controlled rectifier 21 are connected to output terminals 93 and 94 respectively of the bistable multivibrator 26. Bistable multivibrator 26 provides the signal pulses which render rectifier 21 conductive. The anode 24 of silicon controlled rectifier 22 is connected to a terminal 33 of the primary winding 12 and cathode 35 of silicon controlled rectifier 22 is connected to a negative terminal 19 of the high voltage power supply. A second pair of signal output terminals 95 and 96 of the bistable multivibrator 26 are connected to gate 39 and cathode 35 respectively of silicon controlled rectifier 22 to provide signal pulses to render rectifier 22 conductive.

The silicon controlled rectifier is a semiconductor device having an anode, a cathode and a gate. The silicon controlled rectifier can be used as an ON-OFF switch which can be turned on in a very few microseconds. Normally the silicon controlled rectifier cannot conduct current between anode and cathode thereof until a pulse of current larger than a threshold value flows from gate to cathode. If a positive voltage difference exists between the anode and the cathode when the pulse of current flows in the gate, the silicon controlled rectifier "fires" i.e., is rendered conductive, and a current will flow from the anode to the cathode. The rate at which current flow from anode to cathode increases when the silicon controlled rectifier fires must be limited to prevent damage to the rectifier. Once anode-cathode flow commences, the gate has no further control over such current flow. Current flow from anode to cathode in the rectifier can be terminated only by reducing the anode to cathode current below a "holding" or minimum current value. A more detailed description of the operation of a silicon controlled rectifier can be found in the Silicon Controlled Rectifier Manual, Third Edition, 1964, published by the General Electric Company, Auburn, N.Y.

Figure 4:
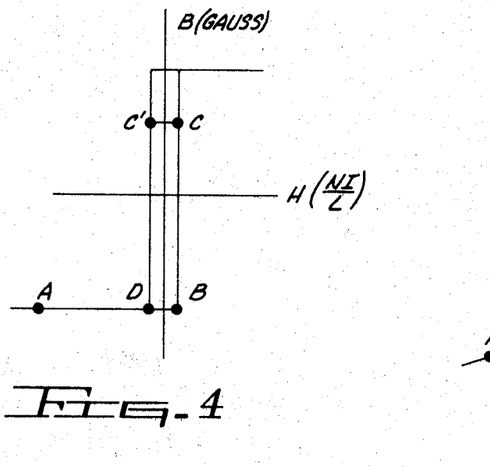
FIGS. 4 and 5 illustrate magnetization curves which are useful in explaining the operation of the circuit shown in FIGS. 1 and 3.

A saturable core employed in transformer 11 produces the magnetization characteristics illustrated in the magnetization curve of FIG. 4. The magnetizing force, H is equal to the product of the number of turns of wire in a winding on the transformer core and the number of amperes of current through these turns of wire divided by the length of core. Since the physical length of a particular transformer is constant, the magnetizing force of a transformer is often expressed as the number of amperes times the number of turns or "ampere-turns." The flux density, B is the number of lines of flux per square centimeter of the transformer core and is determined by the value of the magnetizing force and the type of material used in the core. A discussion of the magnetization curves can be found in the textbook Magnetic Circuits and Transformers by E. E. Staff M.I.T., 1943, published by John Wiley and Sons, New York, N.Y.

Figure 5:
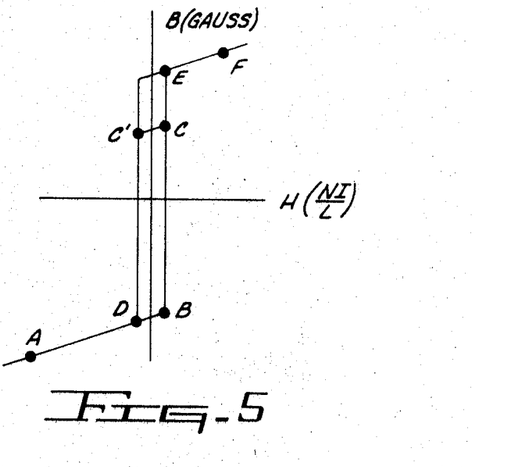

A transformer having only a saturable core can be used in the switching regulator shown in FIG. 1, but the sudden change from a saturated condition to an unsaturated condition at points B and D of the magnetization curve of FIG. 4 causes the generation of electrical noise in the filter circuit. This noise can produce error signals in a data processing system which may be connected to the filter circuit. The horizontal portion of the magnetization curve between points A and B also cause the current in the primary winding to increase very rapidly when silicon controlled rectifier 21 or silicon controlled rectifier 22 is rendered conductive. This rapid increase in current may cause damage to the silicon controlled rectifiers. The amount of noise generated can be greatly reduced and the rate of increase of current in the primary winding 12 can be reduced by using a transformer 11 having a saturable core and a linear core placed side by side with the primary winding extending completely about both cores. The magnetization curve for this combination of a saturable and a linear core is shown in FIG. 5. This magnetization curve of FIG. 5 is very similar to the magnetization curve of FIG. 4 except that between points A and B the curve has an appreciable amount of slope instead of being almost horizontal as shown in the curve of FIG. 4.

A bias power supply 42 provides a current through an inductor 43 and a bias secondary winding 13. Power supply 42 and secondary winding 13 are selected to provide a magnetizing force so that the saturable core is saturated and operating at point A of FIG. 5 when there is no current in the primary winding 12 of transformer 11.

Figure 6:
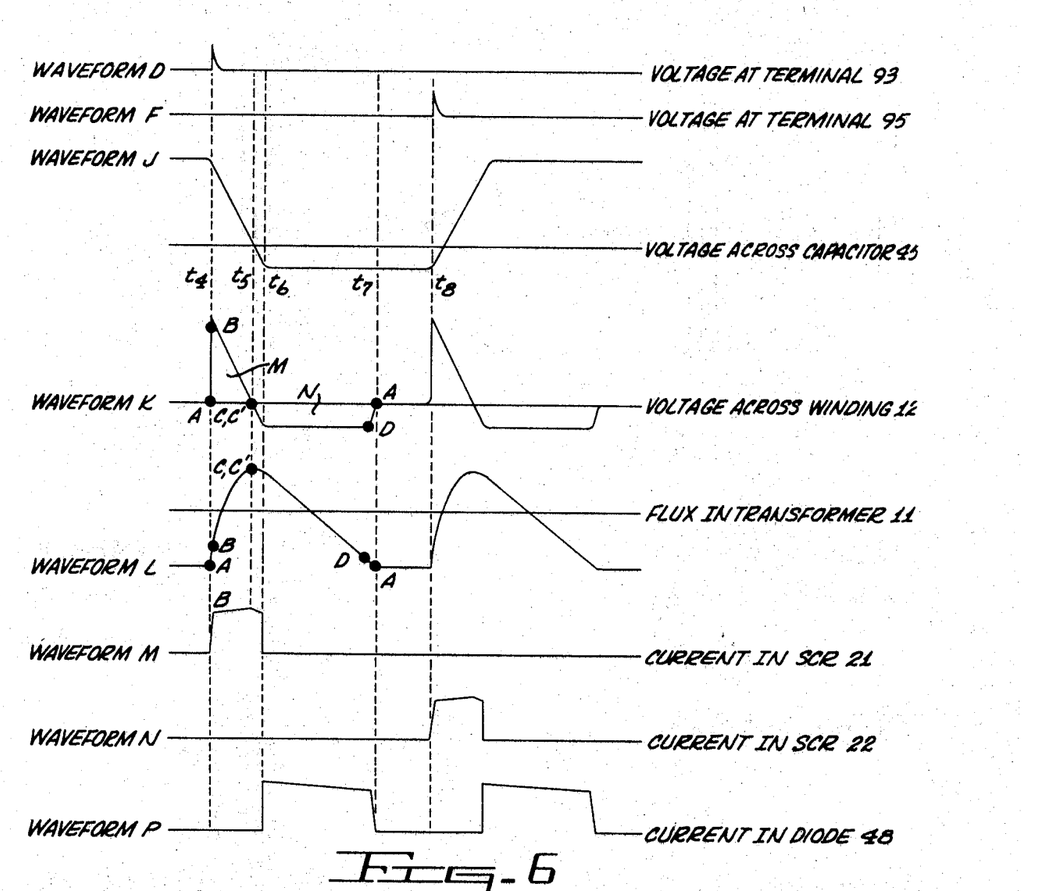
FIG. 6 illustrates waveforms which are useful in explaining the operation of the circuit in FIGS. 1 and 3.

The operation of the switching regulator 10 of FIG. 1 will now be discussed in connection with the magnetization curve shown in FIG. 5 and the waveforms shown in FIG. 6.

A pair of capacitors 45 and 46 provide predetermined quantities of energy to the transformer each time one of the silicon cotnrolled rectifiers is rendered conductive. Prior to time $t_4$ shown in FIG. 6, capacitor 45 of FIG. 1 is charged to the polarity shown in FIG. 1. At time $t_4$ a pulse from terminal 93 of the bistable multivibrator 26 renders silicon controlled rectifier 21 conductive so that the voltage across capacitor 45 is applied to the upper half of primary winding 12 causing a current $I_{15}$ to flow from the upper plate of capacitor 45 from anode 24 through cathode 25 and the upper half of primary winding 12 to the lower plate of capacitor 45. Current $I_{15}$ through primary winding 12 causes a change in flux in the transformer core and causes the operating point to move from point A toward point B of the magnetization curve in FIG. 5. This change in flux produces a voltage across primary winding 12 which limits the rate of increase of current through silicon controlled rectifier 21 thereby preventing possible damage to rectifier 21. The operating point reaches point B when the ampere-turns in primary winding 12 are approximately equal to the ampere turns in the bias secondary winding 13. A positive voltage applied to the upper end of primary winding 12 causes the operating point to move upward from point B toward point C. The distance between point B and point C is proportional to the product of the voltage applied to primary winding 12 and the duration of time this voltage is applied. The substantially vertical slope of the curve between point B and point C shows that there is substantially no change in the current in the primary winding 12 as the operating point moves from point B to point C.

The voltage applied to the upper half of primary winding 12 is magnetically coupled through the transformer core to secondary windings 13 and 14. Between time $t_4$ and time $t_5$ secondary windings 13 and 14 each have a positive polarity of voltage at the lower end of the winding and a negative polarity of voltage at the upper end of the winding. This voltage across secondary winding 13 causes the current $I_{18}$ in inductor 43 to increase thereby storing energy in inductor 43. At the same time, the voltage across secondary winding 14 causes diode 48 to be back biased so that no current flows through this diode or through secondary winding 14. Capacitor 45 provides current $I_{15}$ until this capacitor has discharged at time $t_5$ as shown in waveform J of FIG. 6. The area M under the curve of waveform K (FIG. 6) between time $t_4$ and $t_5$ is a sum of the products of the voltage applied to primary winding 12 and duration of time the voltage is applied and this area M represents the total energy stored in inductor 43. When the voltage applied to primary winding 12 changes through the zero value at time $t_5$, the operating point moves from point C to point C'.

At time $t_5$, the energy stored in inductor 43 provides a current through secondary winding 13 which returns energy to the transformer and reverses the polarity of voltage across each of the transformer windings so that a negative polarity of voltage is developed at the upper end of primary winding 12. This negative polarity of voltage at the upper end of primary winding 12 causes the operating point in FIG. 5 to move from point C' toward point D. Again the distance between point C' and point D is proportional to the product of the voltage across primary winding 12 and duration of time the voltage is applied. The area N under the curve of waveform K between time $t_5$ and $t_7$ is a sum of the products of the voltage across primary winding 12 and the time this voltage is applied and this area N represents the total energy which the inductor 43 returns to the transformer. This voltage across primary winding 12 causes current $I_{15}$ to charge capacitor 45 to a polarity opposite the polarity shown in FIG. 1.

As the energy from inductor 43 is returned to the transformer, the voltages across winding 14 increases to a value larger than the voltage across filter capacitor 51 so that a current $I_{17}$ flows through diode 48 to charge capacitor 51. The value of the capacitor 51 is several times as large as the value of capacitor 45 so current $I_{17}$ causes very little change in the value of voltage across capacitor 51. When current $I_{17}$ flows, this current through secondary winding 14 provides a flux which limits the rate of increase of the voltage across primary winding 12 so that current $I_{15}$ decreases below the holding current necessary to cause silicon controlled rectifier 21 to be conductive. Rectifier 21 is rendered nonconductive and the energy stored in inductor 43 is returned through the transformer to capacitors 51 and 55. When the currents in all of the transformer windings except bias secondary winding 13 decrease to a zero value, the operating point of the magnetization curve shifts from point D back to point A.

The energy which is stored in the inductor when silicon controlled rectifier 21 conducts is proportional to the difference between the flux at point A and point C on the magnetization curve of FIG. 5; and the energy which is transferred from the inductor through the transformer to the output filter when silicon controlled rectifier 21 is nonconductive is proportional to the difference between the flux at point C' and point A. Since the distance between point A and point C along the curve shown in FIG. 5 is substantially the same as the distance between point C' and A substantially all of the energy which was stored in inductor 43 between times $t_4$ and $t_5$ is returned through the transformer between times $t_6$ and $t_7$ and is stored in capacitors 51 and 55. Capacitor 45 delivers substantially the same amount of energy to the transformer each time the silicon controlled rectifier 21 is rendered conductive so that the amount of energy delivered to filter capacitors 51 and 55 and the voltage across these capacitors are determined by the frequency of the pulses applied to gate 28 of rectifier 21.

Capacitor 46 also provides a predetermined quantity of energy to the transformer each time a silicon controlled rectifier 22 is rendered conductive. Prior to time $t_8$, capacitor 46 is charged to the polarity shown in FIG. 1. At time $t_8$, a pulse from terminal 95 of bistable multivibrator 26 renders silicon controlled rectifier 22 conductive so that a current $I_{16}$ flows from the upper plate of capacitor 46 through the lower half of primary winding to anode 32 and cathode 35 to the lower plate of capacitor 46. Current $I_{16}$ through the lower half of primary winding 12 and the voltage impressed across this winding cause the operating point of the characteristic curve in FIG. 5 to move from point A to point B to point C and cause an increase in current $I_{18}$ to store a predetermined amount of energy in inductor 43. When silicon controlled rectifier 22 is rendered nonconductive, this energy is returned through the transformer, and a current $I_{17}$ charges capacitor 51 as described above. The amount of voltage across capacitors 51 and 55 can be controlled by controlling the frequency of the signal pulses which bistable multivibrator 26 applies to the gates of silicon controlled rectifiers 21 and 22. The frequency of these signal pulses is determined by the value of voltage applied to control terminal 62 as described above. When an increase in the amount of current drawn by a load (not shown) connected across the output terminals 58 and 59 of the switching regulator causes the value of voltage at control terminal 62 to fall below a predetermined reference level, the frequency of the output pulses from the bistable multivibrator 26 increases. This increase in the frequency of the output pulses causes an increase in the rate of energy delivered to the output filter capacitors 51 and 55 and increases the voltage at control terminal 62 to the predetermined level. The voltage at output terminal 58 of the power supply controls the frequency of pulses from the multivibrator 26 so that the voltage between output terminals 58 and 59 is substantially constant even when the current drawn from this power supply varies over a wide range of values.

During the time that a positive voltage at the upper end of secondary winding 14 causes current to be supplied to capacitor 51, it is important that the bistable multivibrator 26 not be triggered so that all of the energy which was stored in inductor 43 during the conduction of the silicon controlled rectifier will be returned through the transformer to capacitor 51. If this energy is not all returned prior to the next multivibrator trigger pulse, the operating point of the transformer core will not have returned to point A in FIG. 5. During succeeding periods of conduction of the silicon controlled rectifiers more energy will be stored in the inductor so that the operating point will gradually move upward on each succeeding period of conduction. When the transformer core operates above point E, the core will be saturated during the time the silicon controlled rectifier is conducting. A saturated transformer core allows the current through the silicon controlled rectifier to increase rapidly and to cause damage to the rectifier.

Figure 2:
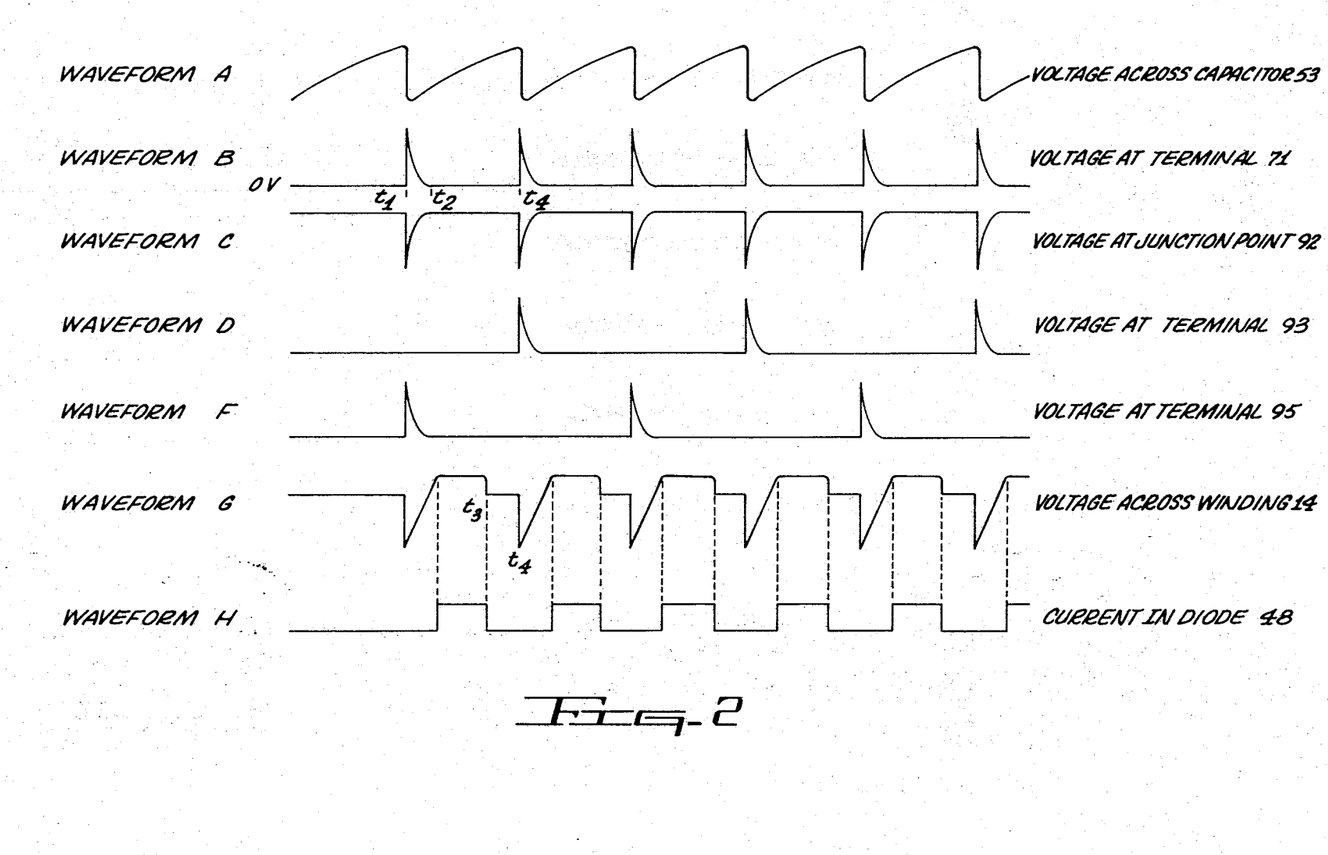
FIG. 2 illustrates waveforms which are useful in explaining the operation of the circuit shown in FIG. 1.

To prevent bistable multivibrator 26 from being triggered, a positive voltage from the upper end of secondary winding 14 is coupled back to input terminal 97 of the disabling circuit 23 at times $t_2$–$t_3$ (waveform G, FIG. 2). The positive voltage at input terminal 97 is coupled through a diode 98, resistors 100 and 103 to the base of transistor 99, thereby rendering transistor 99 conductive. When transistor 99 is rendered conductive, the voltage at the collector of the transistor 99 and at the base of transistor 69 is approximately ground potential so that transistor 69 is rendered nonconductive. When transistor 69 is nonconductive, the capacitor 53 in relaxation oscillator circuit 22 cannot discharge through transistor 69 so that trigger pulses cannot be applied to the input terminal 71 of the bistable multivibrator 26 and the multivibrator cannot be triggered. This novel disabling circuit does allow the capacitor 53 in oscillator circuit 22 to charge during this time so that the oscillator is enabled just as soon as the voltage across secondary winding 14 returns to a zero voltage value. If a large amount of current is drawn from output terminal 58 of the switching regulator 10, the capacitor 53 in oscillator 22 may be charged during the time the oscillator is disabled so that the oscillator will provide a trigger pulse to the multivibrator 26 just as soon as voltage across secondary winding 14 of switching regulator 10 returns to a zero voltage value. When this occurs, time $t_3$ and time $t_4$ shown in waveform G of FIG. 2 would be together. There would be no "dead time" in the switching regulator and the regulator would deliver the maximum value of current to filter capacitors 51 and 55.

Figure 3:
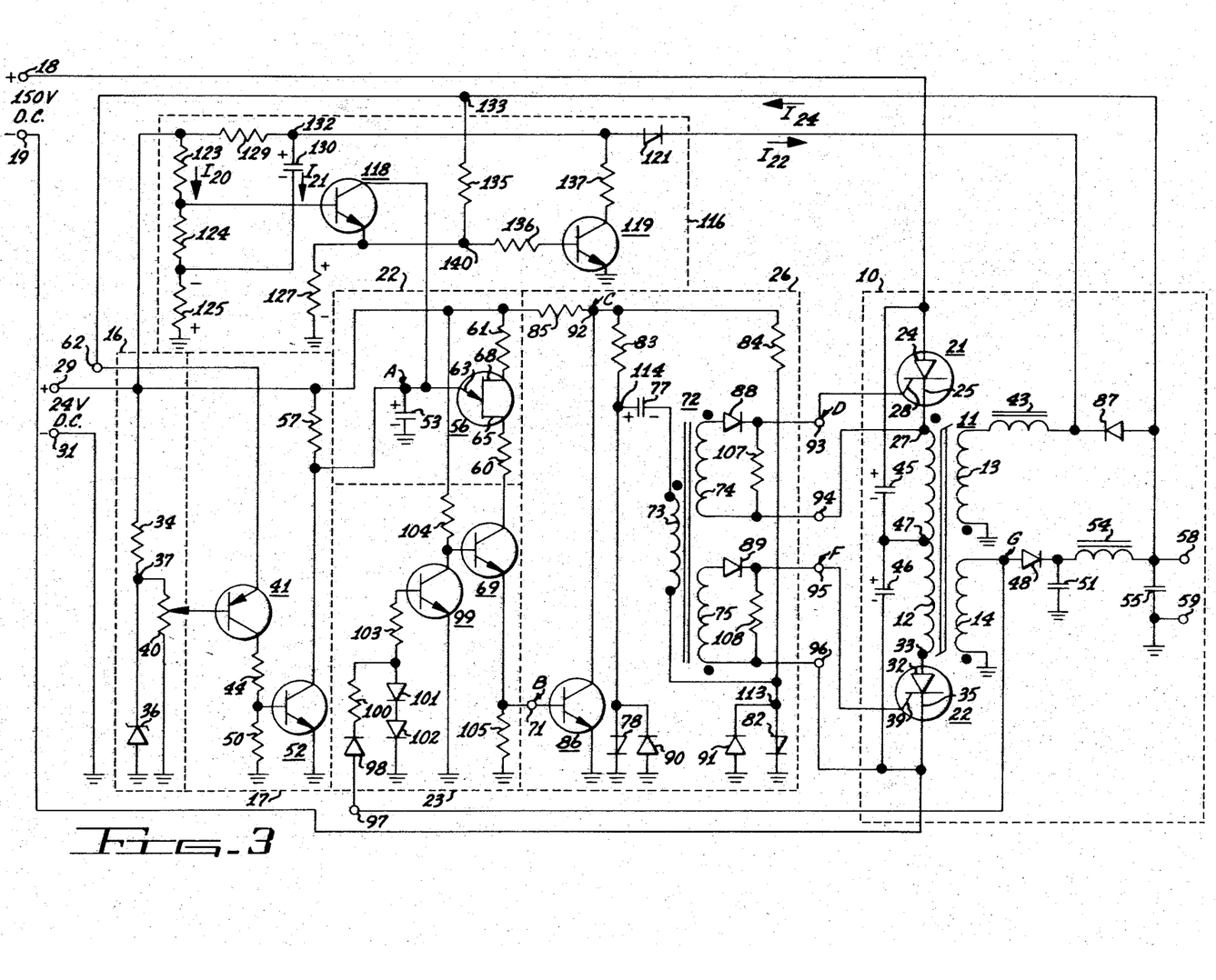
FIG. 3 is a schematic diagram of another embodiment of the instant invention.

FIG. 3 illustrates a second embodiment of the invention shown in FIG. 1 wherein like parts have similar reference characters. The circuit in FIG. 3 differs from the circuit in FIG. 1 in that the bias supply 42 in switching regulator 10 has been removed and the voltage across capacitor 55 supplies bias current through inductor 43 and bias winding 13 during the time when a voltage is developed across capacitor 55. When the switching regulator is initially energized by applying 150 volts to terminals 18 and 19, there is no voltage across capacitor 55. It is desired that a current be supplied to bias winding 13 before pulses are applied to input terminals 93 and 95 of the switching regulator 10 so that transformer 11 operates on the lower portion of the BH curve of FIG. 5. The circuit of FIG. 3 includes a bias control circuit 116 which provides a current for the bias secondary winding 13 of the switching regulator when a switching regulator 10 is initially energized and prior to the time a voltage is produced at output 58 of switching regulator 10. If the oscillator 22 were to oscillate before bias current through winding 13 biases the core of transformer 11 on the desired portion of the BH curve, excessive current could flow through silicon controlled rectifiers 21 and 22 and cause possible damage to these rectifiers or to other components in the switching regulator 10. To prevent this damage the bias control circuit disables the oscillator 22 until current is supplied to bias secondary winding 13. In addition, the bias control circuit disables the oscillator 22 when a heavy overload occurs at output terminal 58 of switching regulator 10 or when the voltage at output terminal 58 decreases below a predetermined threshold value for any reason. This prevents a heavy overload at output terminal 58 from causing excessively large currents through diode 48 which could damage diode 48 and other components in the switching regulator 10.

As indicated in FIG. 3, bias control 116 including a pair of transistors 118 and 119 is coupled to the bias secondary winding 13 by a four-layer diode 121. A voltage divider network comprising resistors 123, 124 and 125 is connected between positive terminal 29 and ground. When power is initially applied to positive terminal 29, a current $I_{20}$ flows from terminal 29 through resistor 123, through base to emitter of transistor 118 and resistor 127 to ground. Current $I_{20}$ through transistor 118 renders transistor 118 conductive so that any voltage which develops across capacitor 53 in oscillator 22 causes a current to flow from the upper plate of capacitor 53 through collector to emitter of transistor 118 and resistor 127 to ground thereby insuring that capacitor 53 remains discharged so that oscillator 22 will not oscillate. At this same time a current $I_{21}$ flows from positive terminal 29 through a resistor 129 to the upper plate of the capacitor 130, from the lower plate of 130 through resistor 125 to ground thereby charging capacitor 130 to the polarity shown in FIG. 3.

When the voltage across capacitor 130 increases to a value greater than the switching voltage of four-layer diode 121, a current $I_{22}$ flows from the upper plate of capacitor 130 through diode 121, through inductor 43 and bias winding 13 to ground, from ground through resistor 125 to the lower plate of capacitor 130. Current $I_{22}$ flowing through bias winding 13 causes the core of the transformer 11 to be biased on the desired portion of the BH curve as described above. Current $I_{22}$ flowing through resistor 125 produces the voltage drop across resistor 125 shown in FIG. 3 and provides a voltage at the base of transistor 118 which renders transistor 118 nonconductive. When transistor 118 is rendered nonconductive, the capacitor 53 in oscillator 22 charges so that oscillator 10 increases to a predetermined value. The voltage at output terminal 58 is also coupled through diode 27 to junction point 133 and bias control circuit 116. The voltage at junction point 133 causes a current to flow through resistor 135 and 127 to ground thereby producing the voltage drop across resistor 127 shown in FIG. 3. The voltage drop across resistor 127 renders transistor 118 nonconductive so that oscillator 22 will continue to oscillate. The positive voltage at junction point 133 also causes a current to flow through resistor 135, resistor 136, from the base of transistor 119 to the emitter to ground thereby rendering transistor 119 conductive. When transistor 119 is conductive, the voltage at junction point 132 is low so that capacitor 130 cannot be recharged.

If a short circuit or an overload should develop at output terminal 58, the voltages at junction point 133 and junction point 140 in the bias control circuit 116 drop to a low value so that transistor 118 is no longer held nonconductive. When transistor 118 is no longer held nonconductive, capacitor 53 in oscillator 22 again discharges through the collector to emitter of transistor 118 and oscillator 22 is disabled.

While the principles of the invention have now been made clear in an illustrative embodiment, there will be immediately obvious to those skilled in the art many modifications of structure, arrangement, properties, the elements, materials, and components, used in the practice of the invention, and otherwise, which are particularly adapted for specific environments and operating requirements without departing from those principles.

What is claimed is:

1. A switching regulator control circuit for use with a switching regulator which delivers pulses of current to an output filter capacitor, said control circuit comprising: a comparator circuit, a constant-voltage supply, said comparator circuit being connected to said supply and to said filter capacitor; an oscillator, said oscillator being coupled to said comparator circuit, said comparator circuit comparing a voltage across said filter capacitor with a voltage from said supply and developing a value of impedance which varies in accordance with the value of voltage across said filter capacitor, said comparator circuit being connected as a frequency determining element for said oscillator whereby the frequency of said oscillator varies directly as the value of said impedance varies; and a bistable multivibrator, said multivibrator being connected to said oscillator, said multivibrator producing trigger pulses having a frequency determined by the frequency of said oscillator; a disabling circuit, said disabling circuit being coupled to said oscillator and to said switching regulator, said switching regulator providing a signal which causes said disabling circuit to disable said oscillator during the time that said switching regulator delivers pulses of current to said output filter capacitor and wherein said multivibrator has a first and a second pair of output terminals, said multivibrator providing trigger pulses alternately to said first and said second pair of output terminals.

2. A switching regulator control circuit for use with a switching regulator which delivers pulses of current to an output filter capacitor, said control circuit comprising: a comparator circuit, a constant-voltage supply, said comparator circuit being connected to said supply and to said filter capacitor; an oscillator, said oscillator being coupled to said comparator circuit, said comparator circuit comparing a voltage across said filter capacitor with a voltage from said supply and developing a value of impedance which varies in accordance with the value of voltage across said filter capacitor, said comparator circuit being connected as a frequency determining element for said oscillator whereby the frequency of said oscillator varies directly as the value of said impedance varies; a bistable multivibrator, said multivibrator being connected to said oscillator, said multivibrator producing trigger pulses having a frequency determined by the frequency of said oscillator, said multivibrator being coupled to said switching regulator; and a bias control circuit, said bias control circuit being coupled to said oscillator and to said filter capacitor, said bias control circuit disabling said oscillator when the voltage across said filter capacitor decreases below a predetermined threshold value.

3. A switching regulator control circuit for use with a power supply and a switching regulator which delivers pulses of current to an output filter capacitor, said control circuit comprising: a caparator circuit, a constant-voltage supply, said comparator circuit being connected to said constant-voltage supply and to said filter capacitor; an oscillator, said oscillator being coupled to said comparator circuit, said comparator circuit comparing a voltage across said filter capacitor with a voltage from said constant-voltage supply and developing a value of impedance which varies in accordance with the value of voltage across said filter capacitor, said comparator circuit being connected as a frequency determining element for said oscillator whereby the frequency of said oscillator varies directly as the value of said impedance varies; a bistable multivibrator, said multivibrator being connected to said oscillator, said multivibrator producing trigger pulses having a frequency determined by the frequency of said oscillator, said multivibrator being coupled to said switching regulator; and a bias control circuit, said bias control circuit being coupled to said oscillator and to said filter capacitor, said bias control circuit disabling said oscillator when the voltage across said filter capacitor decreases below a predetermined threshold value, said power supply being coupled to said switching regulator, said bias control circuit being coupled to said switching regulator, said bias control circuit providing a bias current to said switching regulator when said power supply initially supplies power to said switching regulator.

4. A switching regulator control circuit as defined in claim 3 including: a disabling circuit, said disabling circuit being coupled to said oscillator and to said switching regulator, said switching regulator providing a signal which causes said disabling circuit to disable said oscillator during the time that said switching regulator delivers pulses of current to said output filter capacitor.

5. A switching regulator control circuit as defined in claim 6 wherein: said multivibrator has a first and a second pair of output terminals, said multivibrator providing said trigger pulses alternately to said first and to said second pair of output terminals, said first and said second pair of output terminals being coupled to said switching regulator.

6. A switching regulator control circuit as defined in claim 3 including: a disabling circuit, said disabling circuit being coupled to said oscillator and to said switching regulator, said switching regulator providing a signal which causes said disabling circuit to disable said oscillator during the time that said switching regulator delivers pulses of current to said output filter capacitor and wherein said multivibrator has a first and a second pair of output terminals, said multivibrator providing trigger pulses alternately to said first and said second pair of output terminals, said first and said second pair of output terminals being coupled to said switching regulator.

7. Apparatus for providing a relatively wide variation in electrical currents at a substantially constant value of voltage, for use with a power supply having a positive terminal and a negative terminal, said apparatus comprising: a transformer having a primary and a first secondary winding, said primary winding having a center tap; first and second controllable rectifiers each having an anode, a cathode and a gate, said anode of said first rectifier being connected to said positive terminal of said supply, said cathode of said first rectifier being connected to a first end of said primary winding, said anode of said second rectifier being connected to a second end of said primary winding, said cathode of said second rectifier being connected to said negative terminal of said supply; first, second and third capacitors, said first capacitor being connected between said positive terminal of said supply and said center top of said primary winding, said second capacitor being connected between said center tap of said primary winding and said negative terminal of said supply; a diode having an anode and a cathode, said anode of said diode being connected to a first end of said first secondary winding, said third capacitor being connected between said cathode of said diode and a second end of said secondary winding; a comparator circuit; a constant-voltage supply, said comparator circuit being connected to said constant-voltage supply and to said third capacitor; an oscillator, said oscillator being coupled to said comparator circuit, said comparator circuit controlling the frequency of said oscillator in response to a voltage from said constant-voltage supply and to a voltage across said third capacitor; and a bistable multivibrator having first, second, third and fourth output terminals, said multivibrator being coupled to said oscillator, said multivibrator producing trigger pulses having a frequency determined by the frequency of said oscillator, said first output terminal of said multivibrator being connected to said gate of said first rectifier, said second output terminal of said multivibrator being connected to said cathode of said first rectifier, said third output terminal of said multivibrator being connected to said gate of said second rectifier and said fourth output terminal of said rectifier being connected to said cathode of said rectifier.

8. Apparatus for providing a relatively wide variation in electrical currents at a substantially constant value of voltage as defined in claim 7 including: a disabling circuit, said disabling circuit being coupled to said oscillator and to said first end of said first secondary winding, said first secondary winding providing a signal which causes said disabling circuit to disable said oscillator during the time that a pulse of current flows from said first secondary winding to said third capacitor.

9. Apparatus for providing a relatively wide variation in electrical currents at a substantially constant value of voltage as defined in claim 7 including: a second secondary winding on said transformer; an inductor; and a bias control circuit, said inductor being connected between said bias control circuit and said second secondary winding, said bias control circuit providing a current to said second secondary winding to cause said transformer to be in a saturated condition when power from said power supply is initially applied to the apparatus.

10. Apparatus for providing a relatively wide variation in electrical currents at a substantially constant value of voltage as defined in claim 7 including: a second secondary winding on said transformer; an inductor; and a bias control circuit, said inductor being connected between said bias control circuit and said second secondary winding, said bias control circuit providing a current to said second secondary winding to cause said transformer to be in a saturated condition when power from said power supply is initially applied to the apparatus, said bias control circuit being coupled to said oscillator and to said third capacitor, said bias control circuit disabling said oscillator until a predetermined time duration after power is initially applied to the apparatus.

References Cited
UNITED STATES PATENTS

| 3,164,767 | 1/1965  | Morgan       | 321—45 X |
| 3,197,691 | 7/1965  | Gilbert      | 321—18   |
| 3,219,906 | 11/1965 | Keller et al.| 321—2 X  |
| 3,248,634 | 4/1966  | Fudaley et al.| 321—2   |
| 3,281,644 | 10/1966 | Moore et al. | 321—45   |
| 3,377,538 | 4/1968  | Stich        | 321—2    |

J D MILLER, Primary Examiner

W. H. BEHA, JR., Assistant Examiner

U.S. Cl. X.R.

321—11, 18, 45